Jan. 13, 1959 E. SANFORD 2,869,026

CATHODE RAY SWEEP CORRECTION SYSTEM

Filed Jan. 2, 1952 2 Sheets-Sheet 1

INVENTOR.
EMIL SANFORD
BY
Darby & Darby
ATTORNEYS

CATHODE RAY SWEEP CORRECTION SYSTEM

Filed Jan. 2, 1952 2 Sheets-Sheet 2

INVENTOR.
EMIL SANFORD
BY Darby & Darby
ATTORNEYS

United States Patent Office 2,869,026

Patented Jan. 13, 1959

2,869,026

CATHODE RAY SWEEP CORRECTION SYSTEM

Emil Sanford, Clifton, N. J., assignor to Allen B. Du Mont Laboratories, Inc., Clifton, N. J., a corporation of Delaware Application January 2, 1952, Serial No. 264,511

13 Claims. (Cl. 315—24)

This invention relates to electrical amplifier circuits and particularly to television deflection circuits.

Electron discharge devices of the type adapted to produce an electron beam which is deflected and focussed by electric and/or magnetic fields according to the laws of electron optics are subject to geometrical effects which distort the pattern traced on the target area by the scanning beam. These geometrical distortions are independent of the distortions in the deflecting and focussing wave generators. One such distortion, called pincushion distortion from its similarity to the optical distortion of the same name, occurs particularly strikingly in cathode ray tubes subjected to wide-angle deflection of the scanning beam. The effect of pincushion distortion is to deform a rectangular pattern, commonly known as a raster, into a pattern having outwardly extending corners.

The second type of distortion is a defocussing of the beam due to electron-optical aberrations as well as to geometrical displacements. This second distortion causes the spot to be defocussed at the edges of the screen although it may be properly focussed at the center therein.

The deflecting fields may be properly shaped to counteract one of these distortions at the expense of the other, and in television picture tubes this usually means that the pincushion distortion is counteracted at the expense of defocussing.

One object is to provide improved scanning of cathode ray tubes and the like.

Another object of this invention is to reduce the distortion in electron optical devices.

Another object is to reduce the distortion of the pattern without increasing the distortion of the cathode ray spot.

Still another object is to provide a method of electrically reducing the effects of geometrical distortion in cathode ray tubes and the like.

A further object is to provide compensating circuits in the deflection amplifiers to predistort the signals passing therethrough.

Still a further object is to improve the scanning pattern of wide deflection angle picture tubes.

Other objects will be apparent after studying the following specification together with the drawings in which.

The objects of this invention are carried out by providing means for predistorting the deflection signals according to a given plan so as to counteract electron optical and geometric distortions in electron optical devices. In one embodiment of this invention a signal from the horizontal deflection amplifier is passed through suitable shaping circuits, and applied to the vertical deflection amplifier to modify the wave form of the vertical deflecting signal so as to cause the scanning lines of the raster to be straight and parallel. Simultaneously, a signal is obtained from the vertical deflection amplifier, passed through suitable shaping circuits, and applied to the horizontal deflection amplifier to modulate the amplitude of the horizontal deflection signal to cause all of the lines of the raster to have the same length. For simplicity, it will be assumed that the horizontal and vertical deflection coils in the deflection yoke are perpendicular to each other and are symmetrical. If these conditions are fulfilled, the raster after the proper correction, will have the desired rectangular shape. If one or both of these conditions is not fulfilled, the deflection signals may be suitably modified to correct for this lack.

Figure 1:
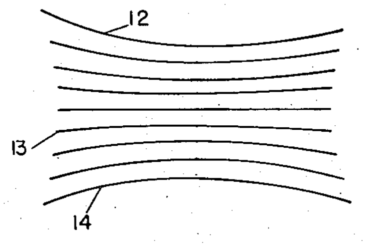
Fig. 1 shows a rectangular scanning pattern subjected to pincushion distortion.

In Fig. 1 the pattern of lines represents a simplified television raster which consists of lines which are distorted into a pattern resembling a pincushion as compared with a desired array of straight parallel lines of equal length. The shape of the pincushion is not dependent on the interlace, or lack of interlace, of the line presentation, although, of course, the shape of the correcting wave will be dependent thereon. The distortion shown is purely geometrical and is independent of time in this respect.

Figure 2:
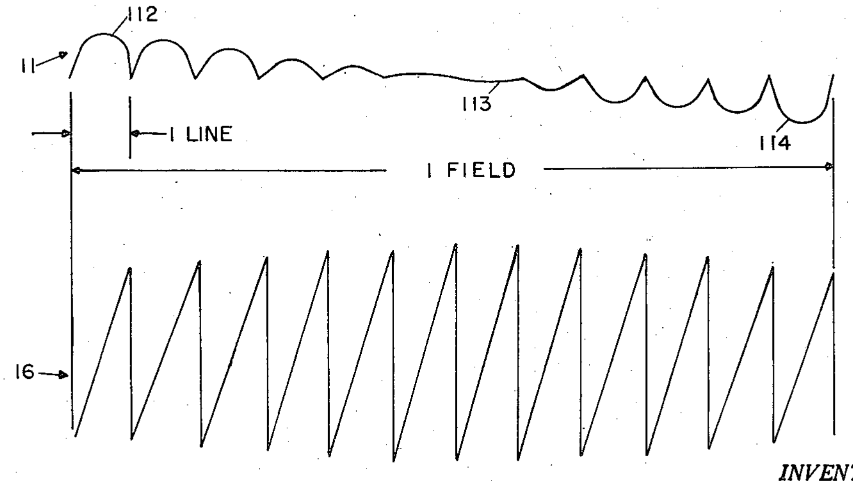
Fig. 2 shows the necessary signals to correct the pattern in Fig. 1 along the desired lines.

The correction wave required to change the pattern shown in Fig. 1 into the desired array of straight lines of equal length is shown in Fig. 2 as wave 11, which represents one field period of the television system and is divided into line periods. The shape of each line period segment of the correction signal is formed to correct the curvature of a corresponding line of the pattern in Fig. 1. For instance, the ends of line 12 in Fig. 1 are elevated more than the ends of any other line in the raster, and consequently, the amplitude of the correction signal for line period 112 in wave 11 must have the greatest positive amplitude of any of the line periods. Line 13 in Fig. 1 requires practically no correction and the amplitude of the correction wave during line period 113 is therefore slight; while the ends of line 14 are depressed by as great an amount, in this instance, as the ends of line 12 are elevated, so that the amplitude of the correcting signal during line period 114 must be the same as the amplitude of the correction component during period 112 but with a negative polarity.

It has been found by measurement of the distorted raster on television picture tubes that the proper form of the correction signal for each line period should be approximately equal to a parabola and that the amplitude of the parabola should change from a maximum in one polarity at the beginning of a field period to a minimum at some point (usually the midpoint) within the field, and then to a maximum in the opposite polarity at the end of the field. This measurement was made on a cathode ray tube having a spherical face plate, and it is possible that if the face plate were other than a segment of a simple sphere, the parabolic shape of the correction wave would have to be modified accordingly. For example, if it were found by observation that correction were only needed at the beginning and end of the field period but were unnecessary over a large portion of the field period due to the shape of the face plate, the amplitude of the parabolic correction wave would be formed with a maximum amplitude at the beginning of the field period reducing to zero after a few line periods, remaining at zero over the necessary portion of the field period, and increasing to a maximum in the opposite polarity at the end of the field period. This formation is within the purview of the invention.

The waveform required to straighten the vertical sides of the raster by making all of the lines therein of equal length is also substantially parabolic as measured on the above-mentioned cathode ray tube face plate, and the repetition rate of this vertical correction signal is equal to the field frequency of the television system. Again, if correction were needed only at the top and bottom of the raster and none were needed over a large section of the center of the raster, it is within the purview of the invention to provide an amplitude-limited parabolic correction wave which would adjust the lengths of the upper and lower lines of the raster without affecting the lengths of the central lines.

In the case of reshaping the vertical sides of the raster in Fig. 1, the amplitude of the horizontal, or line, deflecting signal would be amplitude modulated in accordance with the vertical correction signal to produce a horizontal deflection wave 16, whether that correction signal be truly parabolic or distorted from the true parabolic shape; whereas in the case of reshaping each line of the raster the line correcting signal would be added to the vertical, or field, deflecting signal to produce the wave 11.

Figure 3:
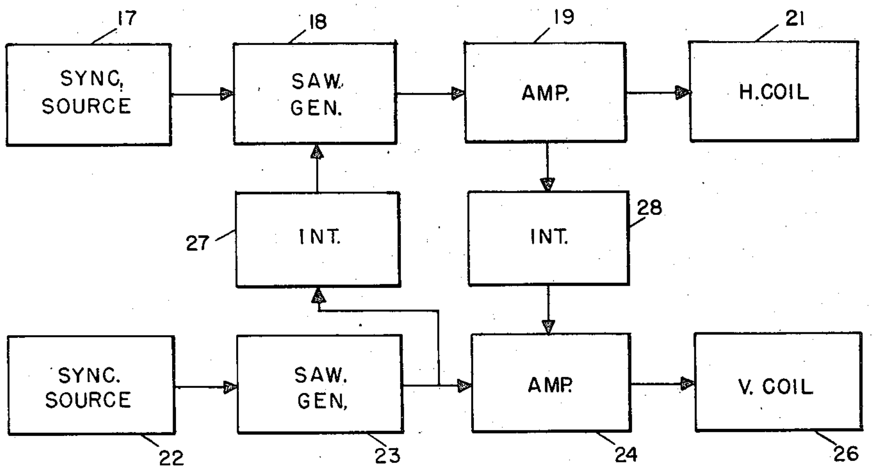
Fig. 3 shows a block diagram of a circuit capable of generating the signals for Fig. 2.

Fig. 3 is a simplified block diagram of one embodiment the complete deflection circuit may take in accordance with the invention. A line frequency synchronizing (called sync) signal source 17, which may be a synchronizing signal generator operating directly or through the medium of a transmitter and receiver, provides a sync signal for a sawtooth wave generator 18. An amplifier 19 may be provided, if necessary, to increase the amplitude of the line or horiontal deflection signal, and the output of this amplifier 19 is connected to the horizontal deflection means 21 to energize the deflection field therein.

The choice of current or voltage depends largely on whether electrostatic or electromagnetic deflection means 21 are employed. Given the information that deflection means 21 consists of electrostatic deflection plates, one skilled in the art of television deflection circuits will be able automatically to supply the ancillary information that waves 11 and 16 in Fig. 2 are voltage waves; while if the deflection means 21 are magnetic coils, the waves 11 and 16 are required to be current waves. One skilled would know of the slight differences in waveform required of the sawtooth waves produced in generator 18 to provide the desired deflecting fields in the two above mentioned types of deflection means. What is referred to here is the peaked voltage wave required to produce a sawtooth current in any physically realizable deflection coil.

A similar deflection circuit comprising a sync source 22, a sawtooth wave generator 23 and amplifier 24 and deflection means 26 is provided for vertical deflection of the cathode ray beams. The remarks in the paragraph immediately preceding with regard to necessary waveforms are also applicable to the vertical deflection circuit.

It is well known that the parabolic electrical waves mentioned hereinabove may be generated by integrating sawtooth waves, and this is done in an integrating circuit 27 to provide a parabolic modulating signal to operate on the horizontal sawtooth generator 18 and produce the modulated wave 16 in Fig. 2. Another integrating circuit 28 is connected to amplifier 19 to be energized thereby to provide the parabolic line frequency component of wave 11. The input circuit of the integrating network 27 may be connected directed to an output circuit of the sawtooth wave generator 23 as shown, or it may be connected through a suitable amplifier such as amplifier 24. Therefore, the sawtooth wave integrated by the network 27 may be considered a replica of the sawtooth wave produced by the generator 23, i. e., the wave to be integrated is substantially the same in shape and timing as the wave amplified by amplifier 24. Similarly, the input of the integrated network 28 may be connected directly to an output circuit of the sawtooth generator 18 instead of being connected to an output circuit of the amplifier 19 as shown.

Within the framework of the circuit of Fig. 3 there must be provided subcircuits capable of generating both wave 11 and wave 16. Wave 16 requires merely that the output circuit of the integrating network 27 be connected to some point in the horizontal deflection circuit to amplitude modulate the horizontal deflection signal at that point. Wave 11 is somewhat more difficult to generate, requiring means to cause the wave first to decrease in amplitude and then to increase in amplitude in the opposite polarity.

Two alternative ways of achieving the desired wave 11 are: first, to utilize constant amplitude sawtooth waves in the production of constant amplitude parabolic waves and subsequently to operate on the amplitude and polarity of the parabolic waves, or, second, to vary the amplitude and polarity of the sawtooth waves applied to integrating circuit 28 and generating the correction components of wave 11 directly therein.

After the choice between these alternatives has been made, there remains a further choice of the method of changing the amplitude and polarity of the type of wave to be varied; i. e., sawtooth or parabolic wave depending on whether the first or second alternative above has been exercised. One method requires the production of a pair of oppositely polarized waves of the type to be varied. This pair may conveniently be produced in a so-called phase-splitter amplifier. Each wave of the pair is then applied to a separate gain-controlled amplifier, and the output signals of these amplifiers are added together. Control of the gain of these amplifiers is effected by a weighting signal so that, for the first part of a field period, one of the amplifiers supplies the output signal while the second amplifier is rendered inoperative, and for the second portion of the field period, the situation is reversed. The first amplifier starts at maximum amplification and reduces to zero amplification within the first portion of the field period. The second amplifier starts from zero amplification in the second portion of the field period and increases to maximum amplification at the termination of the period. The resultant mixed output signal will then have the required amplitude variation and polarity inversion.

A second method also requires the production of a pair of oppositely polarized waves, each of which is present throughout the field period and is applied to a mixer circuit so that the two waves are added linearly and algebraically therein, and a weighting factor is introduced to cause the amplitude of one wave to be a minimum at the beginning of a field period and to increase, although not necessarily linearly, throughout the field. At the same time, the opposite effect is produced on the other wave. This method too, produces the desired result and, as has already been stated, either of these two methods may be used before or after the integrating circuit 28 in the production of wave 11. While linear circuits and elements may be used, no restriction to such devices is implied.

Figure 4:
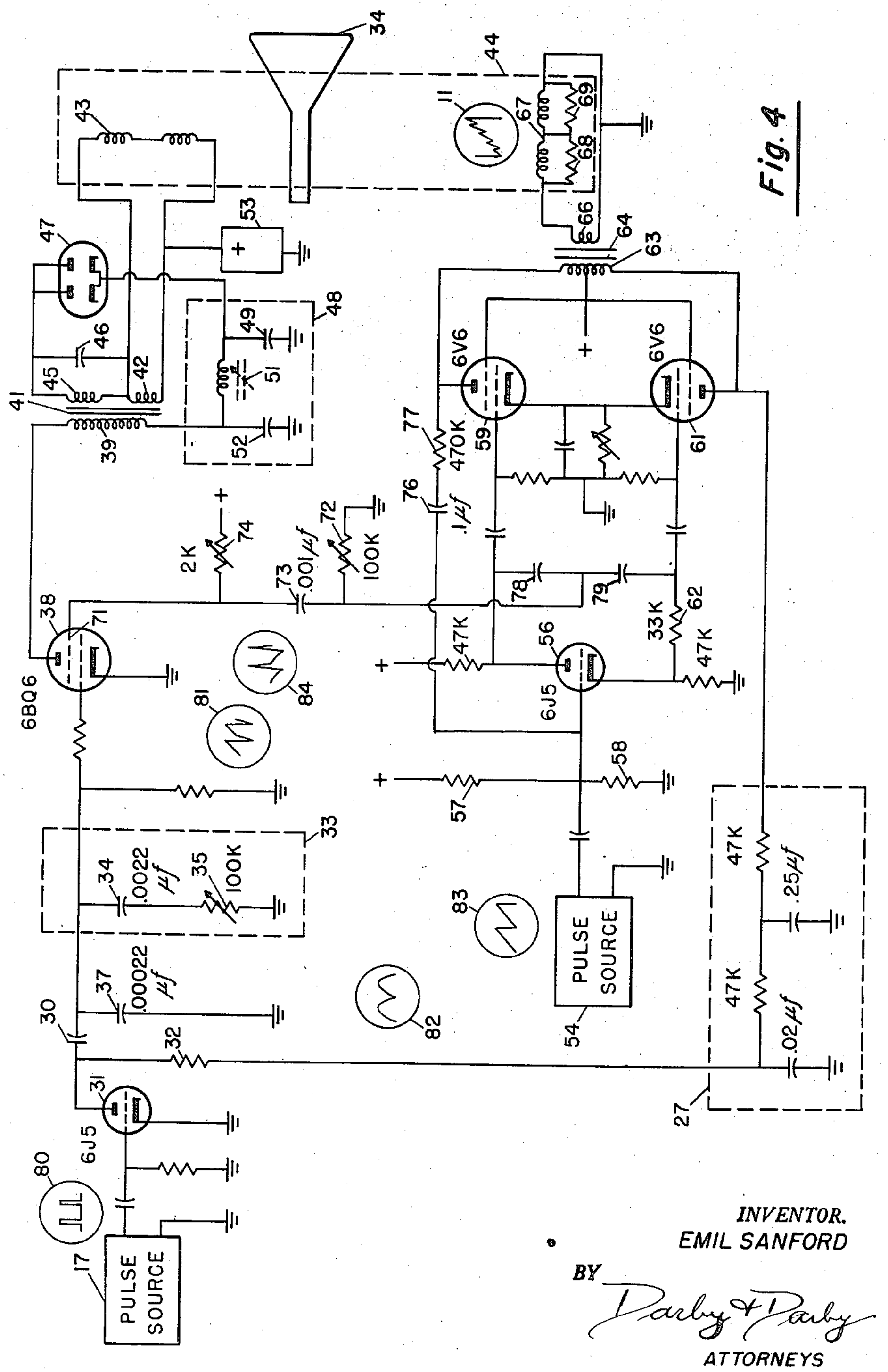
Fig. 4 is a schematic diagram of a television deflection circuit connected according to the invention.

In the circuit of Figure 4, the second alternative and the second method have been employed. This circuit comprises a first pulse source 17 which is identical with the like-numbered source in Figure 3 and which is connected to a sawtooth wave generator tube 31 having a plate circuit comprising a load resistor 32, and the noted circuit 27 described in connection with Figure 3. The plate circuit of tube 31 is coupled by means of a condenser 30 to a sawtooth wave generating circuit 33 comprising a condenser 34 and a resistor 35. A capacitor 37 may be connected in parallel with the circuit 33, which is sometimes known as a peaking circuit. The input circuit of a horizontal output amplifier 38 is connected across the peaking circuit 33, and the plate output circuit of the amplifier 38, comprising the primary 39 of a transformer 41, is coupled by means of the secondary 42 to the horizontal deflection windings 43 of a deflection yoke 44.

An oscillation damping circuit is also connected to the transformer 41 by means of a tertiary winding 45 shunted by a condenser 46 and connected to a diode 47. The cathode of the diode 47 is coupled to the primary 39 of the transformer 41 by means of a phase-shifting network 48 consisting of a condenser 49, an inductance 51 and a second condenser 52, and a source 53 of positive voltage is connected to one end of the secondary winding 42.

The vertical deflection circuit consists of a sawtooth wave generator circuit 54 having its output connected to a phase splitter amplifier 56 which is biased by a pair of resistors 57 and 58 to operate as a class A amplifier. The plate output circuit of tube 56 is condenser coupled to the input circuit of one tube 59 of a pair of push-pull amplifier tubes. The cathode output circuit of tube 56 is symmetrically condenser coupled to the other tube 61 in the push-pull pair. In order to increase the symmetry between the output circuits of tube 56, a resistor 62 is added in the cathode output circuit. The push-pull amplifier tubes 59 and 61 are transformer-loaded by means of the primary 63 of a transformer 64, the secondary 66 of which is connected across the vertical deflection windings 67 of the deflection yoke 44. The electrical oscillations in the windings 67 are damped out by means of conventional, parallel, damping resistors 68 and 69.

The input circuit of the integrating network 27 is connected to the plate of the tube 61. The other tube 59 of the pair of push-pull tubes serves to energize a feedback network consisting of a condenser 76 and a resistor 77. This feedback network is connected to the grid of the tube 56 so that the polarity of the feedback is positive.

It will be noted that no integrating network comparable to integrating network 28 of Figure 3 is shown in this diagram. Instead the screen grid 71 of the horizontal deflection amplifier 38 is connected to the vertical deflection amplifier by means of an RC circuit consisting of a resistor 72 and a condenser 73, which, instead of integrating the signal from the amplifier 38 acts more in the manner of a differentiating circuit. A load resistor 74 is provided for screen grid 71. The output side of the RC coupling network is symmetrically connected by means of condensers 78 and 79 to the input circuits of the push-pull amplifier tubes 59 and 61, respectively.

In the operation of the circuit of Figure 4, the pulse source 17 supplies positive synchronizing pulses 80 recurring at the line, or horizontal, repetition rate. These pulses are amplified in tube 31 and applied to the peaking circuit 33 where they generate the standard, peaked, sawtooth voltage wave 81 required for the generation of a sawtooth current in the horizontal deflection winding 43, and, as was explained in connection with Figure 3, the amplitude of wave 81 is modulated by the parabolic wave 82 from the integrating network 27. The amplitude modulated wave 81 is further amplified by the tube 38 and applied through the transformer 41 to the deflection winding 43 where it produces an amplitude modulated current wave 16 exactly as shown in Figure 2 as wave 16. The operation of the damping circuit is well-known in the art and will not be further explained here since it is included merely to make the circuit of Figure 4 complete and operable.

The field frequency, or vertical, sawtooth wave generator 54 comprises the circuits 22 and 23 of Figure 3 and provides at the output terminals thereof, a sawtooth voltage wave 83. It will be noted that this sawtooth voltage wave 83 is not peaked, as is wave 81, since subsequent amplifiers in the vertical deflection circuit are operated class A. The phase-splitter amplifier 56 provides positive and negative replicas of wave 83 at its cathode and plate output circuits respectively and these positive and negative replicas are coupled to the grids of tubes 61 and 59. Simultaneously, a slightly distorted version 84 of the wave 81 is obtained from the screen grid of tube 38 and presented at the same polarity to both tubes 59 and 61. The wave 84, being applied with the same polarity to the balanced tubes 59 and 61, would be cancelled out in the output circuits if it were not for the dynamic unbalance between these tubes produced by the application of the negative and positive replicas of wave 83 thereto. Since the condition of unbalance changes linearly because of the linear form of the sawtooth signal 83, the signal 84 is transmitted to the output circuit primarily through tube 61 and only slightly through tube 59. As the field period continues, more of the signal is transmitted by tube 59 and less by tube 61, and at approximately the midpoint of the field, the output from the tubes is equal. Consequently, no dynamic unbalance between the tubes exists at this point, and the signal due to wave 84 reduces to zero in the secondary winding 64. As the field period continues beyond the midpoint, the major portion of the component of the output signal due to the wave 84 is transmitted by tube 59 and is in inverse polarity to the component transmitted by the tube 61 at the beginning of the field period.

The RC coupling circuit connecting the screen grid 71 with the vertical amplifier circuit is given the form of a differentiating circuit instead of the integrating network 28 described in connection with Figure 3 because of the inherent components which are necessarily part of the circuit. For instance, the integrating network corresponding to network 28 in Figure 3 actually is located at the output circuit of the transformer 63 of the vertical amplifier and results from the integrating operation on the high frequency wave of the inductance and inherent resistance of the deflection winding 66. The differentiating RC coupling circuit is included to counteract the effect of another circuit in the vertical amplifier which operates as an integrating circuit for the wave 84, since it is well known that differentiation is the inverse mathematical operation of integration. This latter integrating circuit consists of the plate resistance of the push pull tubes and the inherent capacity between the plates of these tubes and ground. While the terms "differentiation" and "integration" have been used, what is meant is that waves corresponding more or less to true differentials and integrals are formed in the circuits so identified.

The feedback circuit employed in the vertical deflection amplifier is to improve the waveform of the vertical deflection signal, and the resistor and condenser values are chosen so that the low frequency components of the deflection wave are fed back to the grid of tube 56 with more attenuation than the high frequency components.

Although the invention has been described in terms of a limited number of alternatives, it will be obvious to those skilled in the art that other alternatives may be used lying within the scope of the invention as defined by the following claims.

What is claimed is:

1. A television deflection circuit comprising a first source of signal voltage having a repetition rate equal to the line repetition rate of a television system and having a sawtooth component; a second source of signal voltage having a repetition rate equal to the field frequency of said television system and having a sawtooth component; a first integrating circuit connected to said first source to form a first wave having a parabolic component; a second integrating circuit connected to said second source to form a second wave having a parabolic component; a first deflection amplifier connected to said first source to be energized thereby; a connection between said second integrating circuit and said first deflection circuit to modify the wave form of the signal passing therethrough; a second deflection circuit connected to said second source to be energized thereby; a connection between said first integrating circuit and said second deflection circuit to modify the signal passing through said second deflection circuit in accordance with the integrating signal from said first integrating circuit.

2. The device of claim 1 in which said second deflection circuit comprises a push pull amplifier.

3. The device of claim 2 in which said integrating circuit is conected equally to the two amplifier tubes comprising said push pull amplifier circuit.

4. The device of claim 1 comprising a differentiating circuit between said first integrating circuit and said second deflection circuit.

5. A television deflection circuit comprising a first sawtooth signal generator; a first amplifier connected to said first generator to be energized thereby; a second sawtooth wave generator; a second amplifier connected to said second sawtooth wave generator to be energized thereby; an integrating circuit connected to said second amplifier, the output of said integrating circuit being connected to said first-named sawtooth signal generator to modulate the amplitude of said first sawtooth signal; a connection between said first amplifier and said second amplifier, said connection including a circuit having restricted low-frequency response so as to act upon the signal passing therethrough in the manner of a differentiating circuit; a circuit connected to said second amplifier, said circuit having a frequency response opposite to the frequency response of said connection; and a second integrating circuit connected to said second amplifier to integrate high frequency components of the signal passing therethrough.

6. A television deflection circuit comprising a first sawtooth signal generator; a first amplifier connected to said first generator to be energized thereby; a second sawtooth wave generator; a second amplifier connected to said second sawtooth wave generator to be energized thereby; a push-pull amplifier connected to said second amplifier to be energized by the output signals therefrom; an integrating circuit connected to said push-pull amplifier to be energized by the sawtooth signal passing therethrough; the output of said integrating circuit being connected to said first-named sawtooth signal generator to modulate the amplitude of said first sawtooth signal; a connection between said first amplifier and both input circuits of said push-pull amplifier, said connection including a circuit having restricted low-frequency response so as to act upon the signal passing therethrough in the manner of a differentiating circuit; a circuit connected to said push-pull tube, said circuit having a frequency response opposite to the frequency response of said connection; and a second integrating circuit connected to said push-pull amplifier to integrate high frequency components of the signal passing therethrough.

7. In a television system utilizing electrical pulses recurring at a high repetition rate and other electrical pulses recurring at a lower repetition rate, a deflection system comprising a first deflection circuit operating at the frequency of said first-named pulses and comprising a first source of sawtooth waves recurring at the frequency of said first-named pulses, said source comprising two output circuits providing sawtooth wave output signals of inverse polarity; a second source of sawtooth wave signals having the same repetition rate as said second named pulses; a shaping circuit having its input connected to said second source; deflection means connected to one of said output circuits of said first source to be energized thereby; a connection between the output of said shaping circuit and said deflection means to modulate the signal in said first deflection circuit in accordance with the shaping signal from said shaping circuit; second deflection means connected to said second source to be energized thereby; a second shaping circuit connected to the other of said output circuits of said first source; and a connection between the output of said second shaping circuit and said second deflection means to influence the operation of said second deflection means in accordance with the shaping signal of said second shaping circuit.

8. In a television system having a deflection arrangement comprising a first source of pulses recurring at the line frequency of said system, a first sawtooth wave generator connected to said source to be energized thereby, an amplifier connected to said generator to be energized thereby, a second pulse source supplying pulses having a repetition rate equal to the field frequency rate of said system, and a second sawtooth wave generator connected to said second pulse source to be energized thereby, the arrangement for predistorting said waves in a predetermined manner comprising a phase splitter amplifier connected to said second sawtooth wave generator to be energized thereby, said phase splitter comprising two output circuits providing two output signals of opposite polarity, a push-pull amplifier comprising two tubes, each of said tubes having an input circuit connected to one of the output circuits of said phase splitter respectively; an integrating circuit connected to one of said two tubes to be energized by the sawtooth wave passing therethrough, the output of said integrating circuit being connected to said first-named sawtooth wave generator to modulate the amplitude of said sawtooth wave; and an integrating circuit connected effectively to said first-named amplifier to be energized thereby, said integrating circuit being connected to said push-pull amplifier to supply integrated signals thereto.

9. In a television system a deflection circuit comprising a first source of pulses recurring at the line frequency of said television system; a first sawtooth wave generator connected to said source to be energized thereby; an amplifier connected to said generator to be energized thereby, said amplifier comprising a multigrid tube; a second pulse source supplying pulses having a repetition rate equal to the field frequency rate of said television system; a second sawtooth wave generator connected to said second pulse source to be energized thereby; a phase splitter connected to said second sawtooth wave generator to be energized thereby, said phase splitter comprising two output circuits providing two output signals of opposite polarity; a push-pull amplifier comprising two tubes, the input circuit of each of said tubes being connected to one output circuit of said phase splitter respectively; an integrating circuit connected to one of said push-pull tubes to be energized by the sawtooth signal passing therethrough, the output of said integrating circuit being connected to said first-named sawtooth wave generator to modulate the amplitude of said sawtooth wave; a common connection from one of said grids of said multi-grid tube to both input circuits of said push-pull amplifier, said connection including a circuit having restricted low-frequency response to act upon the signal passing therethrough in the manner of a differentiating circuit; a positive feedback loop from one of said push-pull tubes to the input of said phase splitter amplifier, a circuit connected to said push-pull amplifier to be energized by the signal passing therethrough, said circuit having a frequency response opposite to the frequency response of said connection; and a second integrating circuit connected to said push-pull amplifier to integrate high frequency components of the signal passing therethrough.

10. A cathode ray tube electron beam deflecting system for correcting geometrical distortion resulting from the difference in center of curvature of the tube faceplate and of the sweep of the electron beam comprising, in combination, means for producing the first sawtooth deflecting signal, means for producing a second sawtooth deflecting signal, an integrating circuit, means including a connection between the output of said first sawtooth signal producing means and the input of said integrating circuit for integrating said first sawtooth signal and providing a parabolic correcting-waveform and modulating means for causing said parabolic correcting-waveform to modulate the amplitude of the signal produced by said second sawtooth signal means, said modulating means including a connection between the output of said integrating circuit and the input of said second sawtooth signal producing means.

11. A cathode ray tube electron beam deflecting system for correcting geometrical distortion resulting from the difference in center of curvature of the tube faceplate and the sweep of the electron beam comprising, in combination, means to produce a first sawtooth deflecting signal, means to produce a second sawtooth deflecting signal, a first integrating circuit, means including a connection between the output of said first sawtooth signal producing means and the input of said first integrating circuit for integrating said first sawtooth signal and providing a first parabolic correcting waveform, a second integrating circuit, means including a connection between the output of said second sawtooth signal producing means and the input of said second integrating circuit for integrating said second sawtooth signal and providing a second parabolic correcting waveform, first modulating means for causing said first parabolic correcting waveform to modulate the signal passing through said second sawtooth signal producing means, said first modulating means including a connection between the output of said first integrating circuit and the input of said second sawtooth signal producing means and a second modulating means for causing said second parabolic waveform to modulate the signal passing through said first sawtooth signal producing means, said second modulating means including a connection between the output of said second integrating circuit and the input of said first sawtooth signal producing means.

12. A television electron beam deflecting system for correcting two-aspect geometrical distortion resulting from the difference in the center of deflection of the electron beam and the center of curvature of the tube faceplate, comprising, in combination, a horizontal sawtooth deflection circuit, a vertical sawtooth deflection circuit, a first integrating circuit, means including a connection between the output of said horizontal deflection circuit and the input of said first integrating circuit for causing said first integrating circuit to integrate a sawtooth signal from said horizontal deflection circuit and provide a first parabolic correcting waveform, means causing the amplitude of said first parabolic waveform to vary cyclically from a positive maximum through zero to a second maximum, a second integrating circuit, means including a connection between the output of said vertical deflection circuit and the input of said second integrating circuit for causing said second integrating circuit to integrate a sawtooth signal from said vertical deflection circuit and provide a second parabolic correcting waveform, first modulating means for modulating the amplitude of signals passing through said vertical deflection circuit with said first parabolic correcting waveform, said first modulating means including a connection between the output of said first integrating circuit and the input of said vertical deflection circuit, and a second modulating means for modulating the amplitude of the signal passing through said horizontal deflection circuit with said second parabolic correcting waveform, said second modulating means including a connection from the output of said second integrating circuit to the input of said horizontal deflection circuit.

13. A circuit for straightening the vertical lines in televised images that would otherwise be bent toward the center of the images comprising, in combination, a source of correction voltage waves of field scanning frequency, the waves having a generally parabolic shape with peaks occurring at the top and bottom of each field, a horizontal driver tube having control electrodes, an electromagnetic deflection circuit coupled to the output of said driver tube, circuits for coupling said source of parabolic waves to a control electrode of said driver tube, a source of waves suitable for controlling the current flowing through said driver tube and circuits for coupling said latter source to a control electrode of said driver tube.

References Cited in the file of this patent

UNITED STATES PATENTS

| | | |
|---|---|---|
| 2,344,810 | Fredendall | Mar. 21, 1944 |
| 2,458,156 | Fredendall | Jan. 4, 1949 |
| 2,534,337 | Canfora | Dec. 19, 1950 |
| 2,566,832 | Grundmann | Sept. 4, 1951 |
| 2,700,742 | Friend | Jan. 25, 1955 |
| 2,758,248 | Garrett et al. | Aug. 7, 1956 |

OTHER REFERENCES

Encyclopedia on Cathode-Ray Oscilloscopes and Their Uses. Rider-Uslan, 1950. John F. Rider Publiser, Inc., page 140, Deflection Distortion.